US012634240B2

(12) United States Patent
Manevich et al.

(10) Patent No.: US 12,634,240 B2
(45) Date of Patent: May 19, 2026

(54) DYNAMIC RATE CONTROL

(71) Applicant: Mellanox Technologies, Ltd., Yokneam (IL)

(72) Inventors: Natan Manevich, Nesher (IL); Dotan David Levi, Kiryat Motzkin (IL); Alex Vaynman, Modi'in Makabim-Re'ut (IL); Roee Moyal, Yoqneam Ilit (IL); Alex Rosenbaum, Elishama (IL); Stanislav Raitsyn, Rehovot (IL); Yuval Atias, Yokneam Moshava (IL)

(73) Assignee: Mellanox Technologies, Ltd., Yokneam (IL)

( * ) Notice: Subject to any disclaimer, the term of this patent is extended or adjusted under 35 U.S.C. 154(b) by 123 days.

(21) Appl. No.: 17/990,552

(22) Filed: Nov. 18, 2022

(65) Prior Publication Data

US 2023/0362097 A1 Nov. 9, 2023

Related U.S. Application Data

(60) Provisional application No. 63/339,876, filed on May 9, 2022.

(51) Int. Cl.
H04L 47/25 (2022.01)
H04L 47/22 (2022.01)

(52) U.S. Cl.
CPC .............. H04L 47/25 (2013.01); H04L 47/22 (2013.01)

(58) Field of Classification Search
CPC ......... H04L 47/25; H04L 47/22; H04L 47/24; H04L 47/34; H04L 47/10; H04L 47/12; H04L 47/27; H04L 47/30; H04L 29/06; H04L 29/08; H04L 12/80; H04L 12/85; H04L 12/28; G06F 13/28
USPC ........................................................ 370/235
See application file for complete search history.

(56) References Cited

U.S. PATENT DOCUMENTS

| | | | | |
|---|---|---|---|---|
| 6,549,963 B1 * | 4/2003 | Sayles | ................. | G06F 13/4054 |
| | | | | 713/1 |
| 6,754,234 B1 * | 6/2004 | Wiesner | ............. | H04N 21/2365 |
| | | | | 375/E7.269 |
| 7,400,578 B2 * | 7/2008 | Guthrie | ............... | H04L 43/0888 |
| | | | | 370/232 |
| 7,725,312 B2 * | 5/2010 | Jabri | ........................ | G10L 19/12 |
| | | | | 704/219 |
| 7,835,423 B2 * | 11/2010 | Sanada | ................. | H04B 7/0845 |
| | | | | 375/147 |
| 7,849,209 B2 * | 12/2010 | Brown | .................. | H04L 5/1446 |
| | | | | 370/537 |

(Continued)

*Primary Examiner* — Man U Phan
(74) *Attorney, Agent, or Firm* — Lowenstein Sandler LLP

(57) ABSTRACT

Aspects of the present disclosure are directed to systems, methods, and computer readable media for dynamic data transfer rate control. One method includes alternating a network device between a plurality of supported data transfer rates that are supported by the network device to achieve an unsupported data transfer rate that is not supported by the network device. Another method includes adding one or more dummy work descriptors to a data stream, and transmitting the data stream including the one or more dummy work descriptors at a supported data transfer rate that is supported by a network device to achieve an effective unsupported data transfer rate that is not supported by the network device.

21 Claims, 9 Drawing Sheets

(56) References Cited

U.S. PATENT DOCUMENTS

| | | | |
|---|---|---|---|
| 7,911,950 B2 * | 3/2011 | Edsall | H04B 10/07953 |
| | | | 370/230 |
| 8,422,444 B2 * | 4/2013 | Gunawardena | H04L 1/0002 |
| | | | 370/329 |
| 8,797,868 B2 * | 8/2014 | Andrews | H04L 49/90 |
| | | | 370/429 |
| 9,344,315 B2 * | 5/2016 | Yang | H04L 27/3488 |
| 9,577,937 B2 * | 2/2017 | Vasseur | H04L 12/28 |
| 10,198,986 B2 * | 2/2019 | Iwami | H04N 21/44231 |
| 11,476,928 B2 * | 10/2022 | Levi | H04W 72/0446 |
| 2003/0012222 A1 * | 1/2003 | Rinchiuso | H04L 1/188 |
| | | | 370/468 |
| 2003/0109261 A1 * | 6/2003 | Razavilar | H04W 28/22 |
| | | | 455/453 |
| 2009/0109867 A1 * | 4/2009 | Mangetsu | H04L 43/50 |
| | | | 370/468 |
| 2010/0041349 A1 * | 2/2010 | Mahany | H04W 74/06 |
| | | | 455/88 |
| 2011/0299408 A1 * | 12/2011 | Gunawardena | H04L 1/0002 |
| | | | 370/252 |
| 2020/0244583 A1 * | 7/2020 | Smith | H04L 49/111 |

* cited by examiner

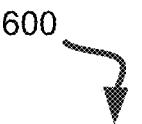

600

Receive a selection of an unsupported data transfer rate
610

Determine that a first data transfer rate is a closest
supported data transfer rate to the unsupported data
transfer rate that is higher than the unsupported data
transfer rate
620

Determine that a second data transfer rate is a closest
supported data transfer rate to the unsupported data
transfer rate that is lower than the unsupported data
transfer rate
630

Alternate a network device between the first data transfer
rate and the second data transfer rate to achieve the
unsupported data transfer rate that is not supported by the
network device
640

FIG. 6

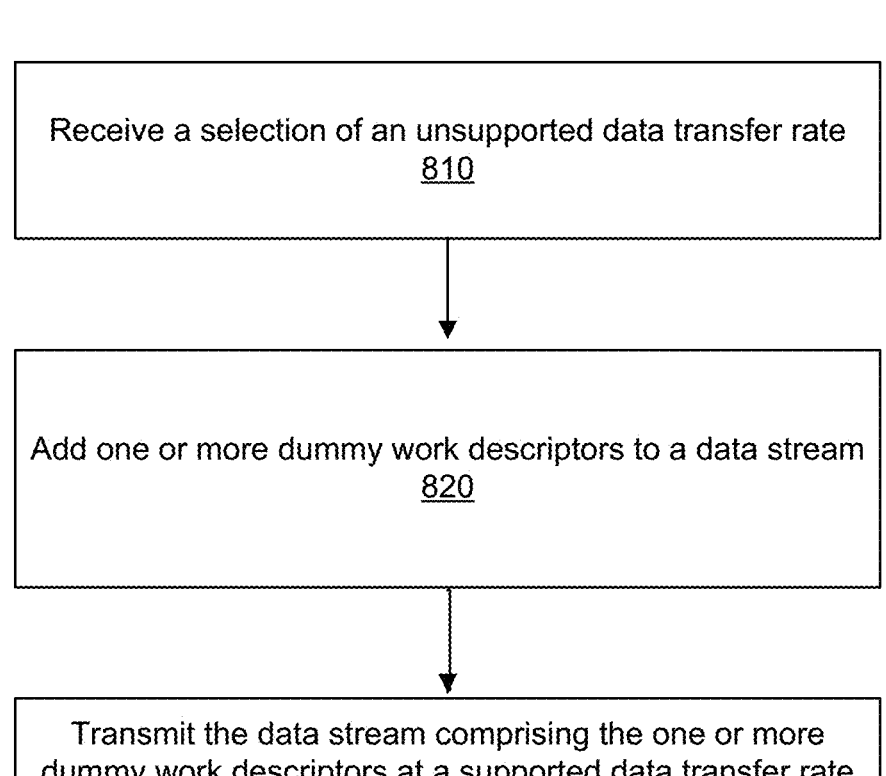
Receive a selection of an unsupported data transfer rate
810
Add one or more dummy work descriptors to a data stream
820
Transmit the data stream comprising the one or more dummy work descriptors at a supported data transfer rate that is supported by a network device to achieve an effective unsupported data transfer rate that is not supported by the network device
830
FIG. 8

DYNAMIC RATE CONTROL

CROSS REFERENCE TO RELATED APPLICATIONS

This application claims the benefit of U.S. Provisional Patent Application No. 63/339,876 filed May 9, 2022, entitled "Dynamic Rate Control", which is incorporated by reference herein.

TECHNICAL FIELD

Embodiments of the disclosure relate generally to computer network devices, and more specifically, relate to methods for precise and dynamic rate control of data transfer in computer network devices.

BACKGROUND

Traffic shaping, packet pacing, and rate limiting are used in some modern computer network applications, such as, data center communication, media streaming, and congestion control algorithms. For example, packet pacing is commonly used to avoid bursty traffic and reduce congestion in a network.

Traffic shaping is a bandwidth management technique used on computer networks which delays some or all datagrams to bring them into compliance with a target traffic profile. Traffic shaping is used to optimize or guarantee performance, improve latency, or increase usable bandwidth for some kinds of packets by delaying other kinds.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 illustrates example operations in a method for dynamic rate control in accordance with some embodiments of the present disclosure.

FIG. 8 illustrates example operations in a method for dynamic rate control in accordance with some embodiments of the present disclosure.

DETAILED DESCRIPTION

Figure 1:
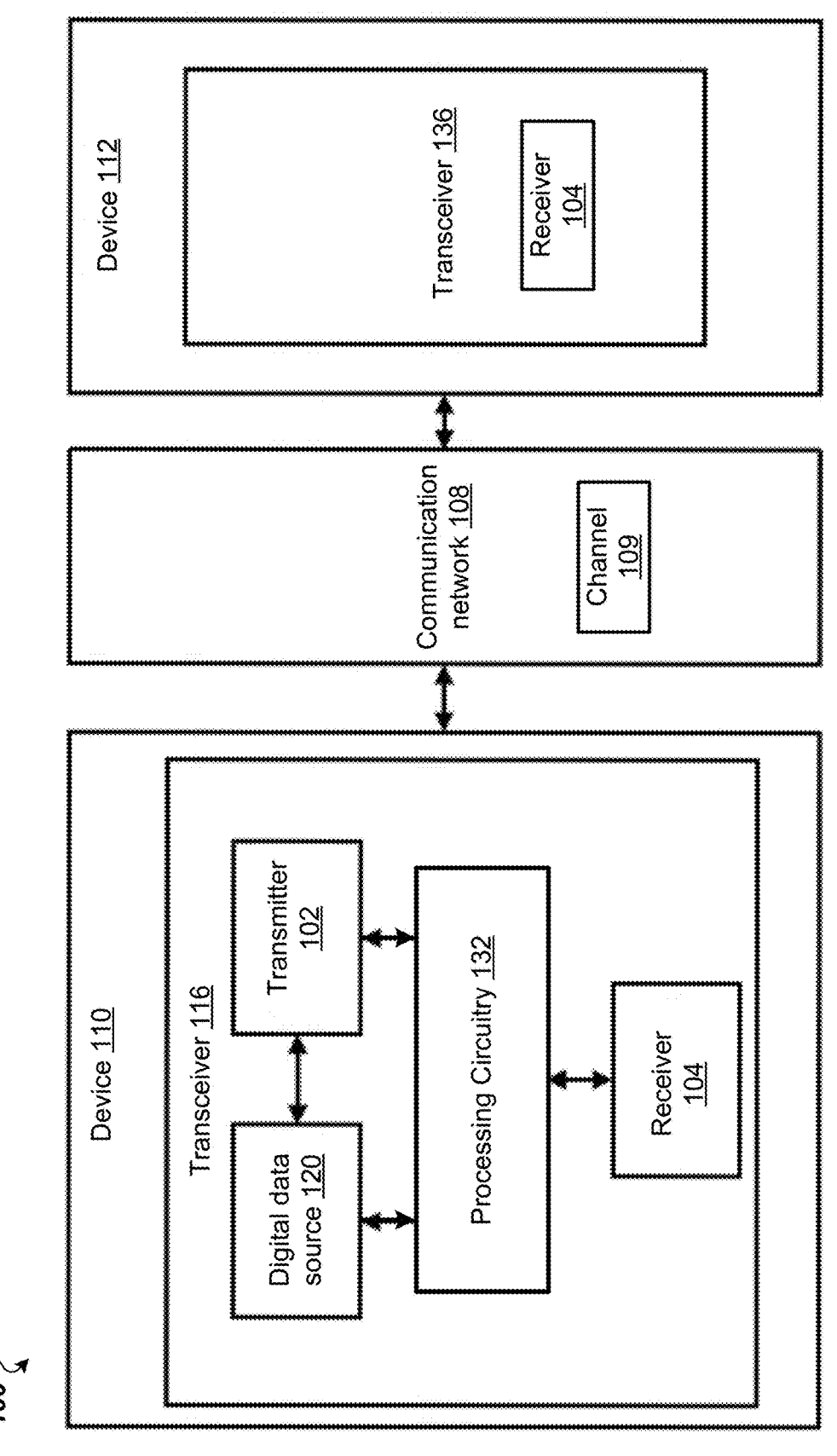
FIG. 1 is an example communication system in accordance with some embodiments of the present disclosure.

Aspects of the present disclosure are directed to systems, methods, and computer readable media for dynamic rate control (e.g., such as dynamic data transfer rate control, dynamic data execution rate control, etc.). One method includes alternating a network device between a plurality of supported data transfer rates that are supported by the network device to achieve an unsupported data transfer rate that is not supported by the network device. Another method includes adding, periodically or aperiodically, one or more dummy work descriptors to a data stream, and transmitting the data stream including the one or more dummy work descriptors at a supported data transfer rate that is supported by a network device to achieve an effective unsupported data transfer rate that is not supported by the network device.

There are generally two types of rate control, which include hardware implemented rate control and software implemented rate control. Software based rate control (e.g., for traffic shaping) is highly flexible and has the ability to enforce complex patterns and behaviors. For example, of a large number of data flows or data transfers, each data flow or data transfer can have a unique rate that is enforced by software. However, software based rate control can use a significant amount of processor (e.g. central processing unit (CPU)) resources. For example, for software based rate control a load can be imposed on a processor due to rate-related software calculations. Such load can reduce CPU resource availability for data processing.

Software based rate control can also have rate control related performance limitations that are not presented by hardware based rate control. For example, software based rate control can have a limited ability to implement packet pacing-based rate control schemes, since high rate packet pacing generally requires very short inter-burst gaps that may not be achievable in software.

Hardware rate control or traffic shaping is performed in hardware (i.e., not by a processor), and thus reduce a load on the processor by enforcing shaping patterns by the network device. However, hardware based solutions are generally less flexible than software-based solutions. For example, hardware-based flow rate limiters usually have a finite number of possible rates that are supported, which may not satisfy the requirements of some network applications. For example, an optimal rate for a particular data flow may be 300 Mb/s, but a hardware-based rate control mechanism may not support the rate of 300 Mb/s. Accordingly, a user may have to select a rate that is either higher or lower than the optimal rate for the data flow (e.g., a rate of 100 Mb/s or 500 Mb/s if those are the two supported rates that are closest to 300 Mb/s). However, given that the hardware has a finite number of possible rates, the software could still find a rate that may be unsupported, which results in either having to round up or round down the rate or to deny a request by the software to transmit at the requested rate.

Accordingly, one embodiment described herein are a method and system for precise and dynamic rate control, which may be achieved by software or hardware or a combination thereof. The method includes alternating a network device between a plurality of supported data transfer rates that are supported by the network device to achieve an unsupported data transfer rate that is not supported by the network device. Such a rate control scheme can achieve any number of target data transfer rates even using a network device that supports only a finite number of data transfer rates. In some embodiments, two closest supported rates are selected for a target unsupported rate, where one of the selected rates is above the target rate and the other selected rate is below the target rate. Hardware and/or software may then determine a timing of when to switch between the two rates. The timing may be selected such that the effective data transfer rate corresponds to or approximately corresponds to the target data transfer rate. Such a rate control scheme provides the advantages of traditional hardware-based rate control mechanisms and the advantages of traditional software-based rate control mechanisms, while avoiding the disadvantages of both.

In one embodiment described herein are a method and system for precise and dynamic rate control, which may be achieved by software or hardware or a combination thereof. The method includes determining a difference between a supported or measured data transfer rate and a target data transfer rate. If the measured data rate is used for comparison with the target rate, then inaccuracies in hardware implementation can be compensated for. For example, hardware can be set at a rate of 100 mbps, but it may actually send data at a rate of 99.99 mbps. Most hardware accelerated rate limit mechanisms cause some possible error margin, and keeping a closed loop with the actual transmitted traffic can also handle such inaccuracies The method further includes determining a size and/or number of dummy work descriptors (e.g., work descriptors that are not actually associated with any data packets to be processed) that, when added to a data stream, cause an effective data transfer rate to be the target data transfer rate for a network device having a rate transfer setting of the supported data transfer rate. One or more dummy work descriptors are then added to the data stream (e.g. single compensation), and the data stream, comprising the one or more dummy work descriptors, is transmitted at the supported data transfer rate that is supported by the network device to achieve the effective unsupported data transfer rate that is not supported by the network device. The network device may use the work descriptors in the data stream to determine how to control the flow of the data. By using the dummy work descriptors, the rate transfer mechanism of the network device includes the size of the dummy work descriptors in the rate calculations and determinations of what packets to be transferred or executed when. However, since the dummy work descriptors are not associated with any actual data that can be executed or transmitted, the actual time taken to transfer or execute the scheduled workload may be based on the time that it takes to transfer or execute the real data in the data stream. In other words, the hardware may take lesser time to "execute" the dummy descriptors as when compared to the time it takes to execute a real workload of the same size. The rate limit mechanism assumes the data was sent when in reality, the dummy work descriptors are "executed" at a very fast rate by passing the information to the rate control mechanisms. For example, if 2.5 packets are sent every second, and it takes 1 micro second to send 1 packet, then at Time 0: 3 packets are sent in 3 μsec total; at Time 1: 2 packets+1 dummy packet are sent in 2 μsec+epsilon total, where epsilon is equal to the time to "execute" the dummy work descriptor; Time 2: same as Time 0; and Time 3: same as Time 1. Thus, the effective data rate can be finely controlled, and may be set to data rates that are not supported in hardware. Such a rate control scheme provides the advantages of traditional hardware-based rate control mechanisms and the advantages of traditional software-based rate control mechanisms, while avoiding the disadvantages of both.

FIG. 1 illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as a central processing unit (CPU), graphics processing unit (GPU), a network interface card (NIC), a smart network interface card (SmartNIC), a data processing unit (DPU), or any network device including a processor and a memory. In at least one embodiment, devices 110 and 112 are two network interface cards (NIC), or two smart network interface cards (SmartNICs), or two data processing units (DPUs), or a combination thereof. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100.

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, wired, optical, or wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 124 includes suitable software and/or hardware for receiving digital data from the digital data source 120 and outputting data signals according to the digital data for transmission over the communication network 108 to a receiver 104 of device 112. Additional details of the structure of the transmitter 124 are discussed in more detail below with reference to the figures.

The receiver 104 of device 110 and 112 may include suitable hardware and/or software for receiving signals, such as data signals from the communication network 108. For example, the receiver 104 may include components for receiving processing signals to extract the data for storing in a memory, as described in detail below with respect to FIGS. 2-8.

The processing circuitry 132 may include software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may include hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

In some examples, the processing circuitry 132 can facilitate a method for precise and dynamic data rate control. For example, the processing circuitry 132 can use dynamic rate control, as described with reference to FIGS. 2-8.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or communication interfaces generally associated with computing tasks, such as sending and receiving data.

In some embodiments, processing circuitry 132 supports a plurality of configurable or pre-defined data transfer rates. In one embodiment, devices 110 and 112 may be configured to dynamically switch flow between a plurality of rates in order to achieve a precise unsupported rate. In other words, devices 110 and 112 may be able to alternate between a plurality (e.g., two) of supported data transfer rates that are supported by the network device to achieve an unsupported data transfer rate that is not supported by the network device. In some embodiments, the supported data transfer rate may be responsive to a data consumption rate of the data-consuming IC (DCIC). For example, device 110 may receive a selection of an unsupported data transfer rate. Device 110 may determine one data transfer rate is a closest supported data transfer rate to the unsupported data transfer rate that is higher than the unsupported data transfer rate. Device 110 may further determine another data transfer rate is a closest supported data transfer rate to the unsupported data transfer rate that is lower than the unsupported data transfer rate.

Device 110 may further alternate between the first data transfer rate and the second data transfer rate in order to achieve the unsupported data transfer rate that is not supported by the network device 110.

In some embodiments, device 110 transmits data at a higher data transfer rate than the unsupported data transfer rate for a predetermined or non-predetermined period of time. The device then determines an actual amount of data transmitted at the higher data transfer rate in that period of time, which is referred to herein as the "actual bytes." The device then determines a nominal amount of data that would be transmitted at the unsupported data transfer rate in the same period of time, which is referred to herein as the "nominal bytes." The device may then determine a difference between the actual bytes and the nominal bytes, and compare that different to a first threshold to determine whether the difference between the nominal amount of data (e.g. nominal bytes) and the actual amount of data (e.g. actual bytes) exceeds the first threshold. In some embodiments, the first threshold may be set to 10,000 bytes, or 5,000 bytes, or 3,000 bytes, depending on the end application. When the device 110 determines that it has transmitted data above the first threshold, the device switches to a supported data transfer rate that is lower than the unsupported data transfer rate.

Similarly, when the device 110 has transmitted data at the lower data transfer rate for a certain period of time, a difference between the actual bytes and the nominal bytes is determined, and compared to the first threshold or a second threshold (which may be higher or lower than the first threshold). If the difference between the nominal amount of data (e.g. nominal bytes) and the actual amount of data (e.g. actual bytes) falls below the first or second threshold, e.g. negative 10,000 bytes, then the device switches to a supported data transfer rate that is higher than the unsupported data transfer rate in order to make up the byte shortage. The device may begin the above sequence using either the first supported data transfer rate that is above the target data transfer rate or the second supported data transfer rate that is below the target data transfer rate.

Figure 2:
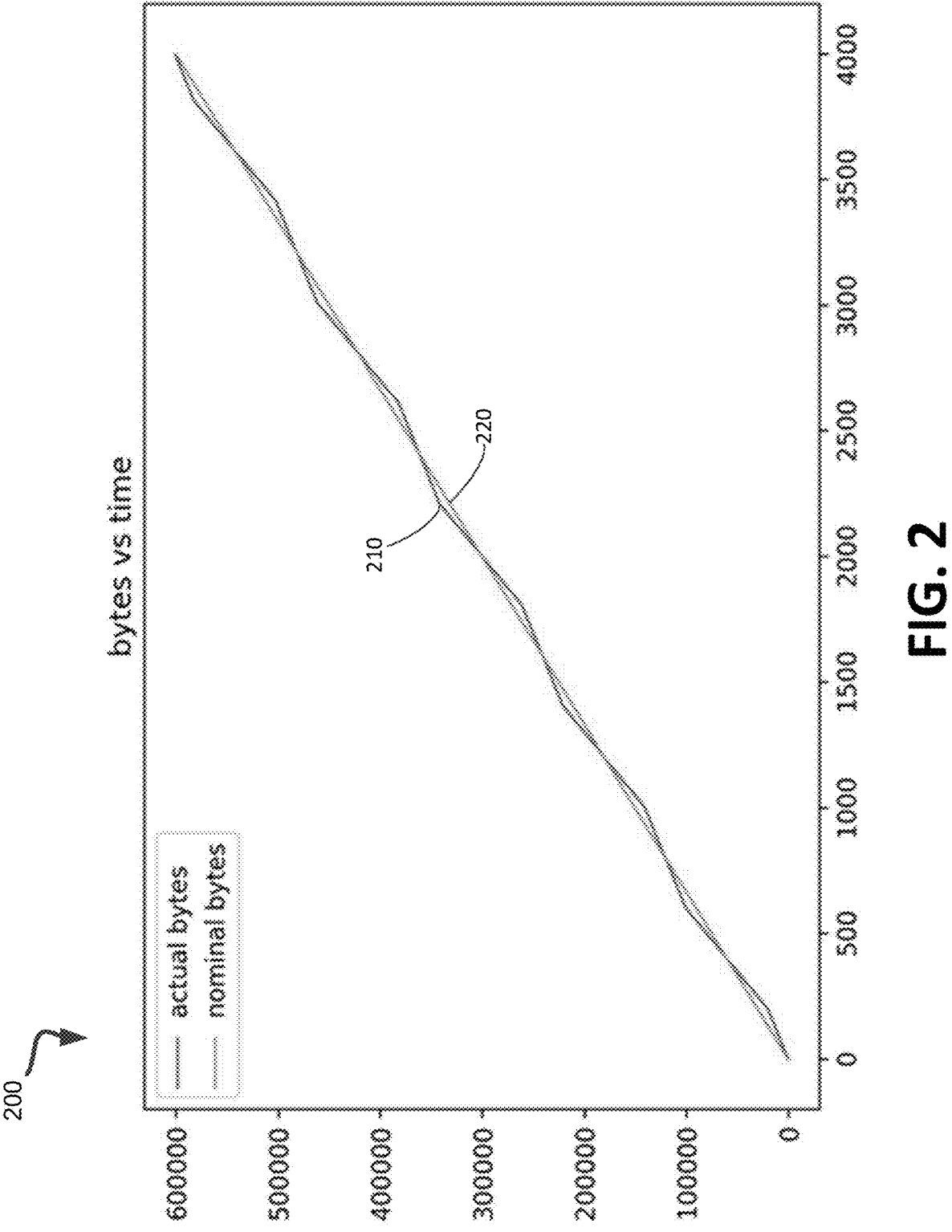
FIG. 2 illustrates an example graph showing dynamic rate control in accordance with some embodiments of the present disclosure.

FIG. 2 illustrates an example graph 200 showing dynamic rate control in accordance with some embodiments of the present disclosure. As shown in this graph, actual byte line 210, which is the supported data transfer rate, treads very closely with the nominal byte line 220, which is the unsupported data transfer rate. As it may be apparent to one of ordinary skill in the art, the gap between the actual byte line 210 and the nominal byte line 220 may be minimized by utilizing a smaller threshold, e.g. 2,000 bytes. However, this also means that the device may switch between the data transfer rates more frequently, thereby using more CPU resources. In embodiments, software is used to instruct a hardware rate control device (e.g., of processing circuitry) to switch to supported data rates, and once the hardware rate control device is set to the supported data rate the data rate is implemented in hardware using the standard hardware rate control mechanism.

The period for which a data transfer is made at the first supported data transfer rate and the second supported data transfer rate can be determined based on synchronized time stamps associated with data transmitted at those data transfer rates, respectively. For example, assuming that an execution timestamp is received upon work completion, the device 110 can then monitor the actual rate of the flow in real time, and save a completion timestamp of the first sent packet. The device 110 then calculates the total number of sent bytes over the calculated total time, e.g. last completion time minus first completion time to determine a data rate. On a newly received completion, the current data rate is determined by dividing the total bytes sent by the total time. In some embodiments, a control mechanism for switching a flow between two supported rates R1 and R2, in order to achieve an unsupported rate R in between, can be achieved as follows. The device associates the flow with either R1 or R2, which are the closest possible supported rate above and below the unsupported rate R. In this example, the flow is associated to R1, which is smaller than R. The device then saves completion timestamp of the first sent packet, and determines the total number of sent bytes in that packet. The device then calculates the total time, which is the last completion time minus the first completion time. The device then calculates the nominal number of bytes which would have been transmitted in the same time period with nominal target but unsupported rate R. The device then calculates the difference D between nominal bytes and the actual transmitted bytes, and if difference D exceeds a threshold, then the device switches the rate of the flow to the other rate, R2.

Figure 3:
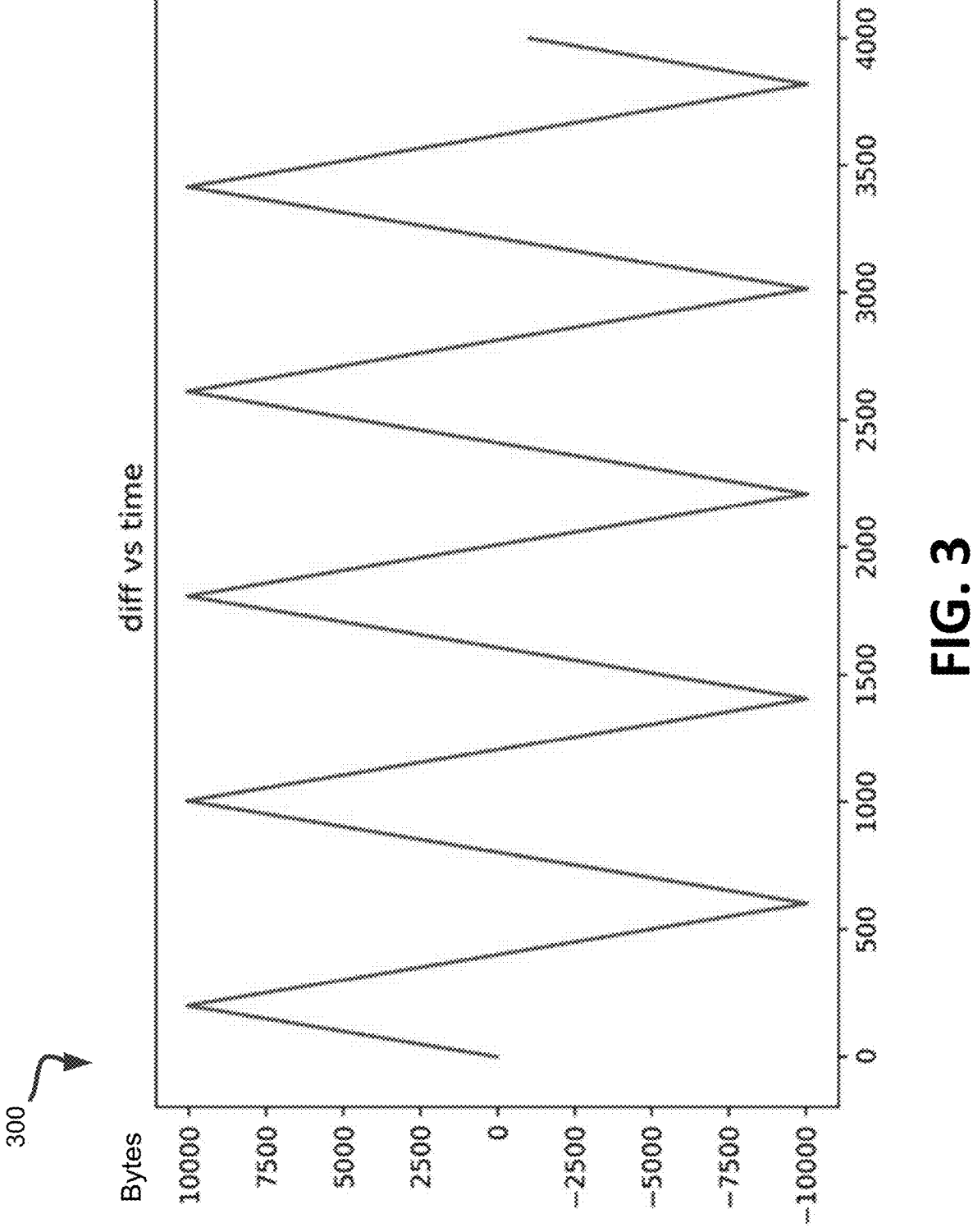
FIG. 3 illustrates an example graph showing dynamic rate control in accordance with some embodiments of the present disclosure.

In this example, R>R1, so the difference D can accumulate in the positive direction, and if difference D exceeds a predetermined threshold, e.g. 10,000 bytes, then the device switches the flow to transmit with rate R2, which is faster than R. This causes the byte difference D to decline, starting from approximately 10,000 bytes down to 0 bytes. The device then waits for the difference to reach a negative threshold, e.g. minus 10,000 bytes, to switch the flow back to R1. FIG. 3 illustrates a graph 300 showing the bytes difference between nominal transmitted bytes versus actual transmitted bytes, at any given time. Although an equal amount of threshold values are provided here, these values are purely exemplary and the positive and negative thresholds need not necessarily be the same.

Figure 4:
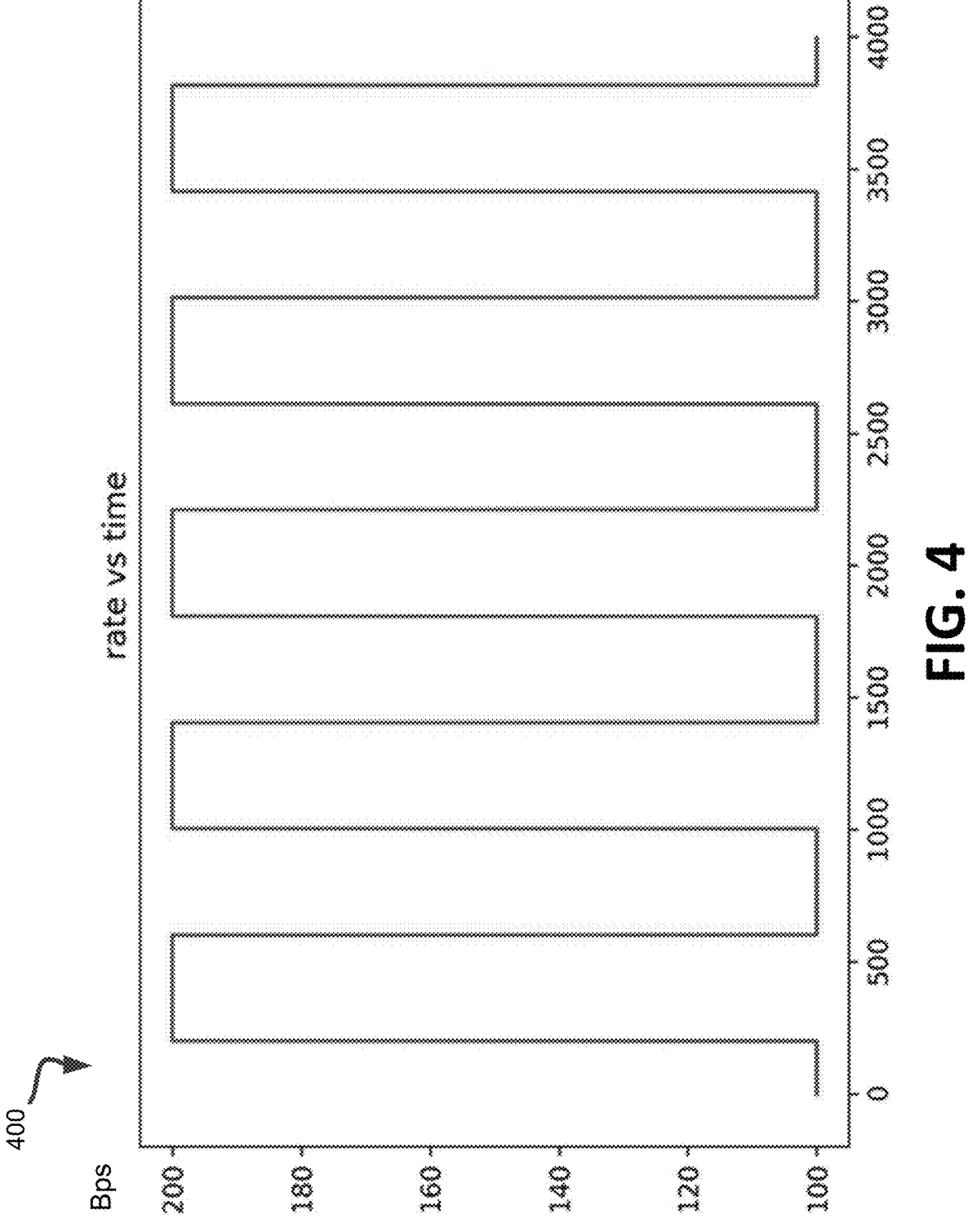
FIG. 4 illustrates an example graph showing dynamic rate control in accordance with some embodiments of the present disclosure.

FIG. 4 illustrates a graph 400 showing the current data rate versus time. In this example, R1 is 100 bytes per second, and R2 is 200 bytes per second. If R is the target rate, e.g. 150 bytes per second, and the threshold value is set at a 10,000 bytes, then the device data transfer rate would alternate between R1 (100 bps) and R2 (200 bps), as illustrated.

Figure 5:
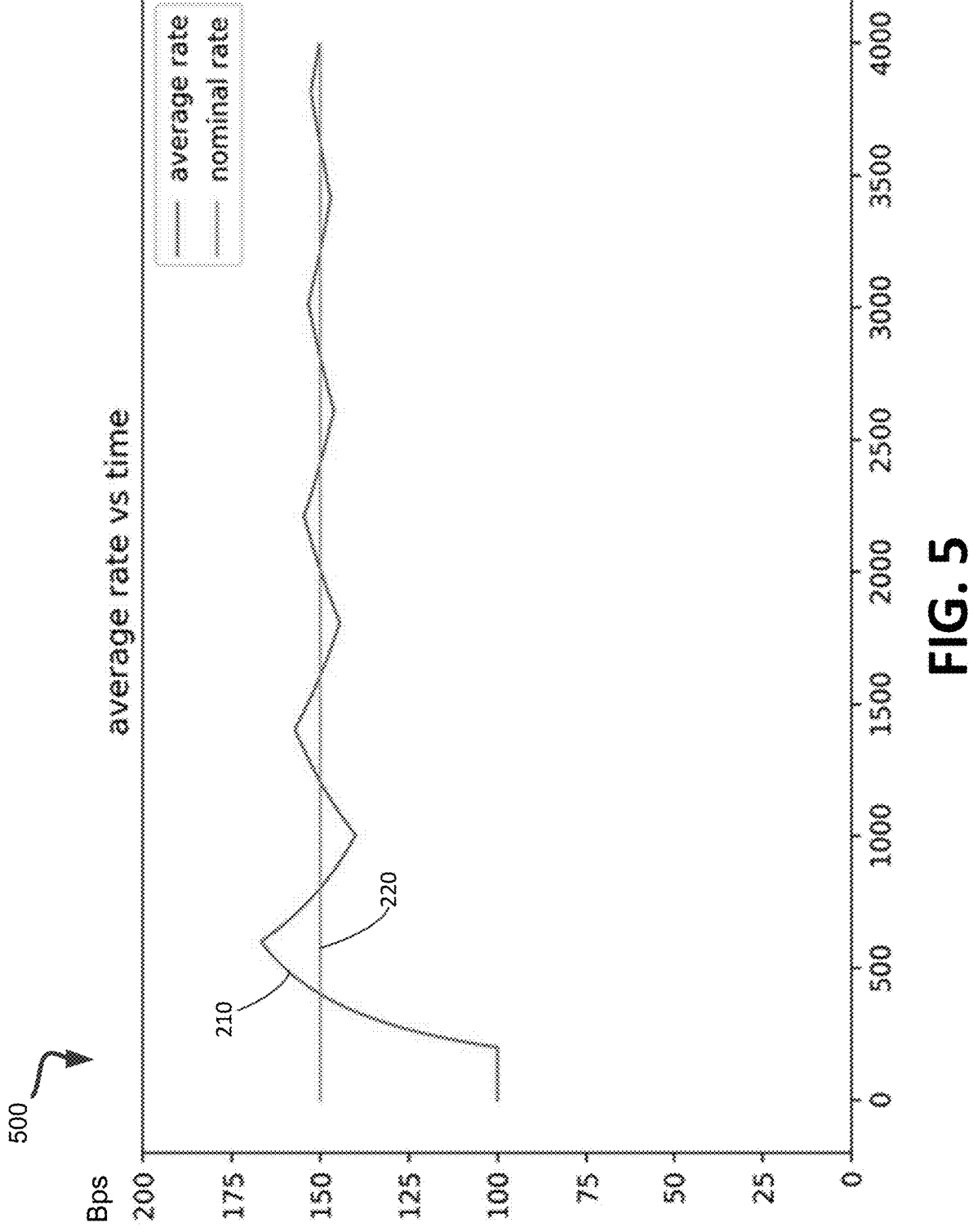
FIG. 5 illustrates an example graph showing dynamic rate control in accordance with some embodiments of the present disclosure.

FIG. 5 illustrates a graph 500 showing the average data rate starting from the time point of initiating the data transfer. It can be noticed here that the device starts with a rate 210 of R1=100 Bps, and eventually converges to the nominal rate 220.

The rate control methods disclosed above can be implemented in software, in hardware, or a combination thereof. For example, the software can pass hardware with metadata which can allow the hardware to decide whether it should switch the rate of the flow. Completion execution time can be captured and processed on every completion, which allows a smoother behavior for the data transfer rate. For example, completion execution time can be captured for every N completions, or every T micro seconds. Smoother behavior can be demonstrated in the 3,000 bytes threshold when compared to the 10,000 bytes threshold, as illustrated in the graphs in FIGS. 2 and 5. However, smoother control mechanism may require higher CPU load in both software only and software and hardware approaches.

In some embodiments, if the timestamp given on work completion is synchronized to real time, for example using a precision time protocol (PTP), then the actual rate R can be achieved by the control mechanism presented above, and the rate would be extremely close to the real time, since all time-related calculations are done based on synchronized timestamps of work execution completions.

Packet pacing, also known as "rate limiting," defines a maximum bandwidth allowed for a TCP connection. Limitation is done by hardware where each QP (transmit queue) has a rate limit value from which it calculates the delay between each packet sent. In other words, packets transmitted over an offloaded socket may be rate-limited, thus, allowing granular rate control over the software defined flows. A rate-limited flow is allowed to transmit a few packets (burst) before its transmission rate is evaluated, and next packet is scheduled for transmission accordingly.

If hardware supports packet pacing, which is a data rate technique that involves evenly distributed traffic consisting of small bursts, and rates R1, R2 mentioned above are paced by hardware, then the overall behavior of the flow which is toggled between pace rates R1 and R2 can resemble a paced traffic, since it is being paced at any given time, only with slightly different rates. For example, the traffic may consist of small bursts, which are more or less evenly distributed, and such traffic can have the packet pacing advantages of reducing probability of congestion in the network.

In some embodiments, an abstraction layer can be defined to expose a flow rate limit mechanism which supports any rate. The abstraction layer, which can be implemented in software, can execute the solution without being visible outside of the layer. For example, if the hardware supports 256 configurable rates, then the device 110 can evenly spread those rates between min rate and max rate, in a linear or logarithmic scale. For example, if the device starts at 1 Mbps and goes up with 5 percent increments, then the last rate can approximately be about 250 Gbps, which represents a very wide range. Using the methods disclosed above, the device can then achieve any transmission rate or data rate in between.

If actual transmission or data rate should not necessarily be perfectly equal to a target rate, then an "open loop" approach can be used for switching a flow between existing rates. For example, if 100 Mbps and 200 Mbps rates are supported by hardware, and a user wants 150 Mbps, then software can switch between existing 100 and 200 Mbps with approximately 50:50 time ratio between the rates, without keeping a closed loop of keeping the transmitted bytes close to the nominal number. In some embodiments, processing logic may determine a duty cycle for switching between two or more rates based on those rates and a target rate. The duty cycle may be selected to cause the combination of data transmitted or executed at the two or more rates, in the aggregate, effectively achieves the target data rate.

FIG. 6 illustrates example operations in a method 600 for dynamic rate control in accordance with some embodiments of the present disclosure. In this method, the network device supports a plurality of configurable or pre-defined data transfer rates, and the device may be configured to dynamically switch flow between a plurality of rates in order to achieve a precise unsupported rate. In other words, the network device may be able to alternate between a plurality (e.g., two or more) of supported data transfer rates that are supported by the network device to achieve an unsupported data transfer rate that is not supported by the network device.

In some embodiments, the supported data transfer rate may be responsive to a data consumption rate of the data-consuming IC (DCIC). For example, at operation 610, the processing logic of the network device may receive a selection of an unsupported data transfer rate. At operation 620, the processing logic of the network device may determine a data transfer rate that is a closest supported data transfer rate to the unsupported data transfer rate and that is higher than the unsupported data transfer rate. At operation

630, the processing logic of the network device may further determine another data transfer rate is a closest supported data transfer rate to the unsupported data transfer rate and that is lower than the unsupported data transfer rate. At operation 640, the processing logic of the network device may alternate between the first data transfer rate and the second data transfer rate in order to achieve the unsupported data transfer rate that is not supported by the network device.

In some embodiments, the network device transmits data at a higher data transfer rate than the unsupported data transfer rate for a predetermined period of time. The device then determines an actual amount of data transmitted at the higher data transfer rate in that period of time, which is referred to herein as the "actual bytes." The device then determines a nominal amount of data that would be transmitted at the unsupported data transfer rate in the same period of time, which is referred to herein as the "nominal bytes." The device may then determine that a difference between the nominal amount of data (e.g. nominal bytes) and the actual amount of data (e.g. actual bytes) exceeds a predetermined threshold. In some embodiments, the threshold may be set to 10,000 bytes, or 5,000 bytes, or 3,000 bytes, depending on the end application. When the network device determines that it has transmitted data above the predetermined threshold, the device switches to a supported data transfer rate that is lower than the unsupported data transfer rate.

Similarly, when the network device has transmitted data at the lower data transfer rate for a certain period of time, and the difference between the nominal amount of data (e.g. nominal bytes) and the actual amount of data (e.g. actual bytes) falls below the predetermined threshold, e.g. negative 10,000 bytes, the device switches to a supported data transfer rate that is higher than the unsupported data transfer rate in order to make up the byte shortage.

In some embodiments, a rate control mechanism that relies on dummy work descriptors is implemented by a network device. A dummy work descriptor may be a work descriptor that is not associated with an actual payload. Conventional work descriptors of a data stream are generally each associated with a payload of actual data to be sent or processed. The conventional work descriptors may include a byte size specifying a size of the payload. However, a dummy work descriptor on the other hand may specify a byte size of a non-existent payload. The dummy work descriptors may be interleaved with real work descriptors to achieve data rates that are unsupported by hardware rate limiters in embodiments, as described further below. In embodiments, network devices that implement this rate control technique support dummy work descriptors.

Figure 7:
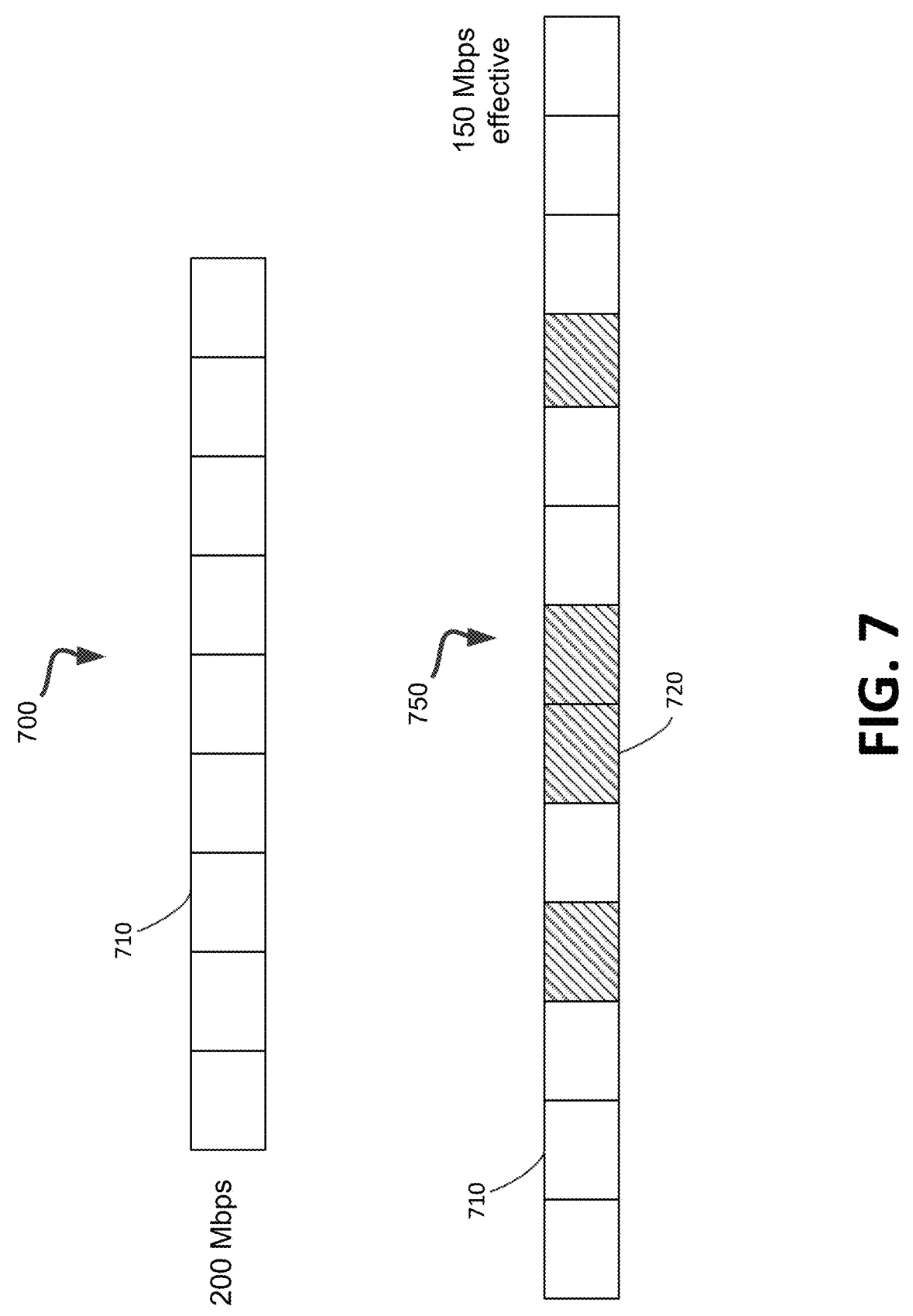
FIG. 7 illustrates example operations in a method for dynamic rate control in accordance with some embodiments of the present disclosure.

FIG. 7 illustrates example operations in a method for dynamic rate control in accordance with some embodiments of the present disclosure. In this example, a data stream 700 being transmitted at a supported data rate of 200 Mbps is illustrated. The data stream 700 may include a plurality of data packets 710. To this data stream 700, a new type of work descriptor for dummy execution of configurable workload size, for example, a dummy execution of 1500 bytes, can be used for rate balancing of a transmitting flow by essentially lowering the effective executed workload. In this example, dummy work descriptors 720 are interleaved in between data packets 710 in order to form a new data stream 750. By adding the dummy work descriptors 720, periodically or aperiodically, in between data packets 710, the device can transfer data at an effective rate of 150 Mbps, which may be unsupported by the device. In some embodiments, the dummy work descriptors and the real work descriptors may include at least one of work queue elements (WQE) or dummy commands. The dummy work descriptors may be used for packet rate enforcement. For simplicity of depiction and description and without limiting the generality of the foregoing, work descriptors are generally described herein.

The dummy work descriptors 720 can be executed by treating them as if the configurable "workload size" was actually executed as a regular workload, and counting it in the relevant traffic shaping mechanisms. In this example, assuming the device is capable of supporting several configurable rates at any given time, and associating each flow to one of those rates, a precise flow rate can be achieved by using the configurable dummy descriptors suggested above.

For example, a work queue may be limited by the hardware to 100 Mbps rate. If the "regular" workload of this queue consists of 1500 bytes of network packets, and every 9 of those regular packets are followed by a single dummy work descriptor with dummy workload of 1500 bytes, the effective bandwidth of the regular packets will be 90% of 100 Mbps, which equals to 90 Mbps.

Some example methods for implementing workload, bytes, and token consumption of the dummy work descriptors include configurable chunks of workload and number of bytes; configurable number of bytes, but limited by the typical burst size of the work queue; a single burst size of the work queue; and complementing current execution session to the typical burst size. For example, if burst size is 10,000 bytes and 1500 bytes are already executed, a dummy work descriptor of this type can execute the remaining 8,500 bytes. These methods may be used to achieve desired target behavior of keeping an unsupported effective rate by lowering an existing rate supported by the device using dummy work descriptors.

In some embodiment, when the execution timestamp is received upon work completion, the device can monitor the actual rate of the flow in real time. It can be achieved, for example, by saving a completion timestamp of the first sent packet, counting a total number of sent bytes, calculating total time based on last completion time minus first completion time, and on a newly received completion, the current rate can be determined by diving the total bytes sent over the total time. Similarly, a rate control mechanism for "ingesting" flow workload with the newly proposed configurable dummy descriptors to lower the effective rate can also be achieved.

For example, the device may associate the flow to the closest possible supported rate R1, which is higher than R. The device may then save completion timestamp of the first sent packet, count total number of sent bytes, calculate total time based on last completion time minus first completion time, and calculate the nominal number of bytes which would have been transmitted in the same time period with nominal target rate R. The device may then calculate the difference D between nominal bytes and the actual transmitted bytes, and since R1>R, D should always be positive. The device may then post a configurable dummy work descriptor of D bytes in order to result in an effective unsupported rate that is equal to the target data rate.

Activating the steps of the control system proposed above may not necessarily be synchronized and may not necessarily be triggered by a newly received work completion. For example, it can be triggered every certain period of time, or every 'X' executed bytes. The difference D between actual transmitted bytes versus wanted number should not necessarily be posted in a single dummy work descriptor, but can be split to several dummy work descriptors separated by "regular" workload, in order to smooth the effective execution rate. Thresholds can also be defined, so that the dummy work descriptors can be injected only when D reaches a certain threshold.

FIG. 8 illustrates example operations in a method 800 for dynamic rate control in accordance with some embodiments of the present disclosure. As illustrated in the figure, at operation 810, the network device may receive a selection of an unsupported data transfer rate from the controller. At operation 820, the network device may add one or more dummy work descriptors (e.g. 720 illustrated in FIG. 7) to a data stream (e.g. 700 illustrated in FIG. 7). At operation 830, the network device (e.g. 110 illustrated in FIG. 1) may transmit the data stream (e.g. 750 illustrated in FIG. 7) including the dummy work descriptors 720 at a supported data transfer rate that is supported by a network device to achieve an effective unsupported data transfer rate that is not supported by the network device. In embodiments, the determination of what dummy work descriptors to generate, generation of dummy work descriptors, and interleaving of the dummy work descriptors to a data flow are performed in software or firmware. In some embodiments, the dummy work descriptors and the real work descriptors may include at least one of work queue elements (WQE) or dummy commands. The dummy work descriptors may be used for packet rate enforcement. For simplicity of depiction and description and without limiting the generality of the foregoing, dummy work descriptors are generally described herein. The data flow, including the dummy work descriptors, may then be processed or transferred by hardware according to a hardware rate limiter at a set supported data rate to achieve another lower data rate that is not supported by the hardware rate controller. While some processing may be performed by software in embodiments, the amount of processing performed (and thus the amount of processor resources consumed) by software is much lower than that of standard software-based rate controllers.

The rate control methods disclosed above can be implemented in software, in hardware, or a combination thereof. For example, the software can pass hardware with metadata which can allow the hardware to decide whether it should switch the rate of the flow. Completion execution time can be captured and processed on every completion, which allows a smoother behavior for the data transfer rate. For example, completion execution time can be captured for every N completions, or every T micro seconds. Smoother behavior can be demonstrated in the 3,000 bytes threshold when compared to the 10,000 bytes threshold, as illustrated in the graphs in FIGS. 2 and 5. However, smoother control mechanism may require higher CPU load in both software only and software and hardware approaches.

In some embodiments, if the timestamp given on work completion is synchronized to real time, for example using a precision time protocol (PTP), then the actual rate R can be achieved by the control mechanism presented above, and the rate would be extremely close to the real time, since all time-related calculations are done based on synchronized timestamps of work execution completions.

If hardware supports packet pacing, which means evenly distributed traffic consist of small bursts, and rates R1, R2 mentioned above are paced by hardware, then the overall behavior of the flow which is toggled between paces rates R1 and R2 can resemble a paced traffic, since it is being paced at any given time, only with slightly different rates. For example, the traffic may consist of small bursts, which are more or less evenly distributed, and such traffic can have the packet pacing advantages of reducing probability of congestion in the network.

In some embodiments, an abstraction layer can be defined to expose flow rate limit mechanism which supports any rate. The abstraction layer, which can be implemented in software, can execute the solution without being visible outside of the layer. For example, if the hardware supports 256 configurable rates, then the device 110 can evenly spread those rates between min rate and max rate, in a linear or logarithmic scale. For example, if the device starts at 1 Mbps and goes up with 5 percent increments, then the last rate can approximately be about 250 Gbps, which represent a very wide range. Using the methods disclosed above, the device can then achieve any transmission rate in between. In some embodiments, the network device can also support dedicated "dummy" descriptors. Such dummy descriptors can have a fixed byte or token consumption value, or a configurable value inside the descriptor.

Figure 9:
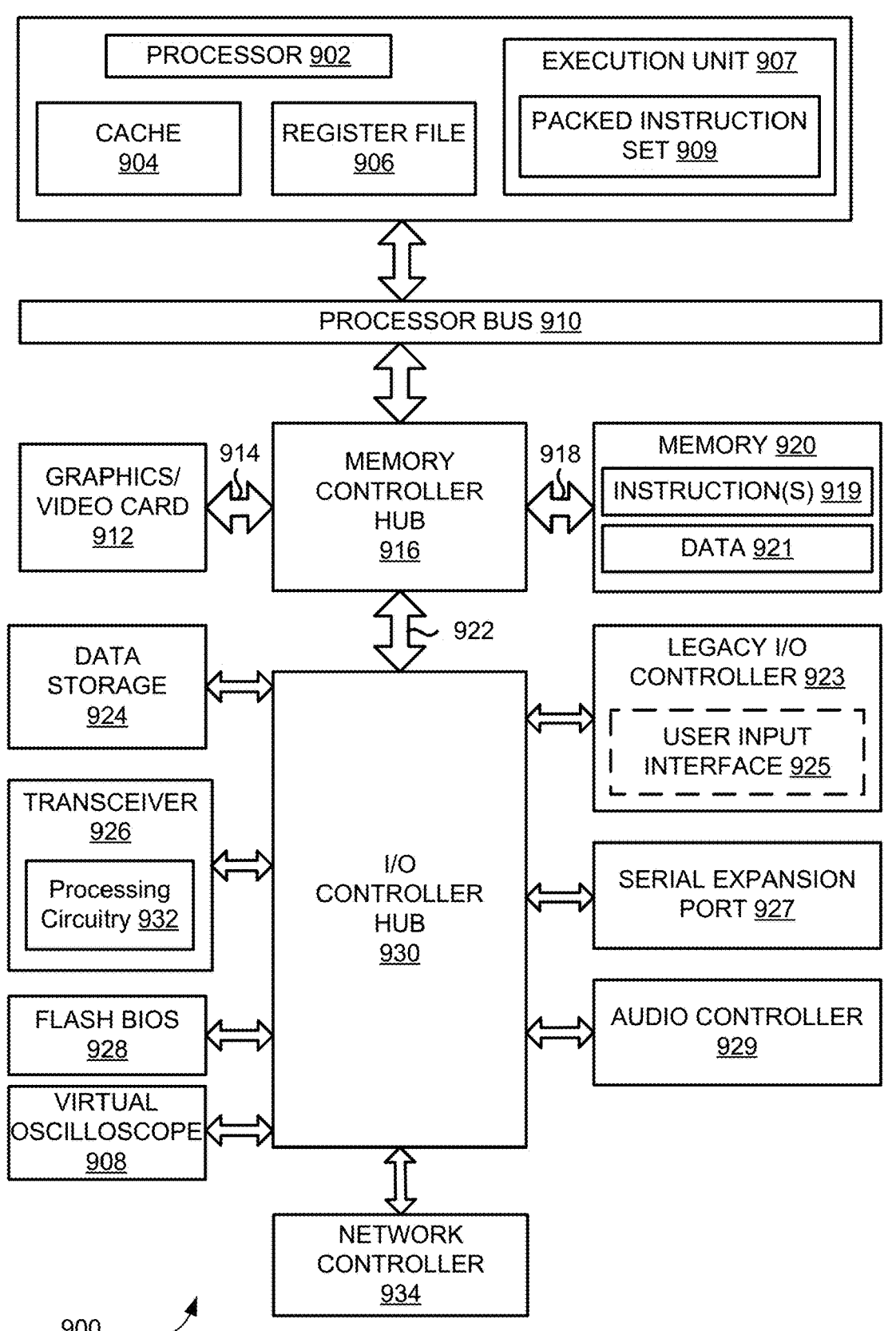
FIG. 9 illustrates an example computer system including a transceiver including a chip-to-chip interconnect, in accordance with some embodiments of the present disclosure.

FIG. 9 illustrates a computer system 900 including a transceiver including a chip-to-chip interconnect, in accordance with at least one embodiment. In at least one embodiment, computer system 900 may be a system with interconnected devices and components, an SOC, or some combination. In at least one embodiment, computer system 900 is formed with a processor 902 that may include execution units to execute an instruction. In at least one embodiment, computer system 900 may include, without limitation, a component, such as processor 902 to employ execution units including logic to perform algorithms for processing data. In at least one embodiment, computer system 900 may include processors, such as PENTIUM® Processor family, Xeon®, Itanium®, XScale® and/or StrongARM®, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of Windows® operating system available from Microsoft Corporation of Redmond, WA, although other operating systems (UNIX and Linux for example), embedded software, and/or graphical user interfaces, may also be used.

In at least one embodiment, computer system 900 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 900 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 900 may include, without limitation, processor 902 that may include, without limitation, one or more execution units 907 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 900 is a single processor desktop or server system. In at least one embodiment, computer system 900 may be a multiprocessor system. In at least one embodiment, processor 902 may include, without limitation, a CISC microprocessor, a RISC microprocessor, a VLIW microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. In at least one embodiment, processor 902 may also include a combination of both internal and external caches. In at least one embodiment, a register file 906 may store different types of data in various registers including, without limitation, integer registers, floating point registers, status registers, and instruction pointer register.

In at least one embodiment, execution unit 907, including, without limitation, logic to perform integer and floating point operations, also resides in processor 902. Processor 902 may also include a microcode ("ucode") read only memory ("ROM") that stores microcode for certain macro instructions. In at least one embodiment, execution unit 909 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 900 may include, without limitation, a memory 920. In at least one embodiment, memory 920 may be implemented as a DRAM device, an SRAM device, flash memory device, or other memory device. Memory 920 may store instruction(s) 919 and/or data 921 represented by data signals that may be executed by processor 902.

In at least one embodiment, a system logic chip may be coupled to processor bus 910 and memory 920. In at least one embodiment, the system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, a chipset, and processor 902. Examples may include, without limitation, an audio controller 929, a firmware hub ("flash BIOS") 928, a transceiver 926, a data storage 924, a legacy I/O controller 923 containing a user input interface 925 and a keyboard interface, a serial expansion port 927, such as a USB, and a network controller 934. Data storage 924 may include a hard disk drive, a floppy disk drive, a CD-ROM device, a flash memory device, or other mass storage device. In an embodiment, the transceiver 926 includes a constrained FFE 908.

In at least one embodiment, FIG. 9 illustrates a system, which includes interconnected hardware devices or "chips" in the transceiver 926—e.g., the transceiver 926 includes a chip-to-chip interconnect including the first device 110 and second device 112 as described with reference to FIG. 1). In at least one embodiment, FIG. 9 may illustrate an exemplary SoC. In at least one embodiment, devices illustrated in FIG. 9 may be interconnected with proprietary interconnects, standardized interconnects (e.g., PCIe), or some combination thereof. In at least one embodiment, one or more components of system 900 are interconnected using compute express link ("CXL") interconnects. In an embodiment, the transceiver 926 can include processing circuitry 132 as described with reference to FIGS. 1 and 7. In such embodiments, the processing circuitry 132 can facilitate a method for precise and dynamic rate control, as described herein. For example, the processing circuitry 132 can use a method precise and dynamic rate control, as described with reference to FIGS. 2-8.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "receiving," "providing," "obtaining," "using," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method of data transfer rate control, comprising:
receiving, by a first network device from a second network device, a selection of a target data transfer rate, wherein the target data transfer rate is an unsupported data transfer rate that is not supported by the first network device;
determining, based on the target data transfer rate, a first data transfer rate of a plurality of supported data transfer rates and a second data transfer rate different from the first data transfer rate of the plurality of supported data transfer rates, wherein each of the plurality of supported data transfer rates are supported by the first network device; and
achieving data transfer at the target data transfer rate by alternating between transferring data at the first data transfer rate and transferring data at the second data transfer rate.

2. The method of claim 1, wherein the first data transfer rate is higher than the target data transfer rate and the second data transfer rate is lower than the target data transfer rate.

3. The method of claim 2, further comprising:
determining that the first data transfer rate is a closest supported data transfer rate to the target data transfer rate that is higher than the unsupported data transfer rate;
determining that the second data transfer rate is a closest supported data transfer rate to the target data transfer rate that is lower than the unsupported data transfer rate; and
selecting the first data transfer rate and the second data transfer rate.

4. The method of claim 2, further comprising:
transmitting data at the second data transfer rate for a first period of time;
determining an actual amount of data transmitted at the second data transfer rate in the first period of time;

determining a nominal amount of data that would be transmitted at the target data transfer rate in the first period of time;
determining that a difference between the nominal amount of data and the actual amount of data exceeds a predetermined threshold; and
transmitting data at the first data transfer rate for a second period of time.

5. The method of claim 1, further comprising:
determining a nominal amount of data that would be transmitted at the target data transfer rate in a first period of time;
determining that a difference between the nominal amount of data and an actual amount of data transmitted at a first data transfer rate during the first period of time exceeds a threshold, wherein the first data transfer rate is one of the plurality of supported data transfer rates; and
responsive to exceeding the threshold, transmitting data at a second data transfer rate for a second period of time, wherein the second data transfer rate is one of the plurality of supported data transfer rates.

6. The method of claim 5, wherein the first period and the second period are determined based on synchronized time stamps associated with data transmitted at the first data transfer rate and the second data transfer rate.

7. The method of claim 1, wherein the first network device comprises at least one of a network interface card (NIC) or a data processing unit (DPU).

8. A network device comprising:
a memory device; and
a processing device, operatively coupled with the memory device, to perform operations comprising:
receiving, by the network device from a second network device, a selection of a target data transfer rate, wherein the target data transfer rate is an unsupported data transfer rate that is not supported by the network device;
determining, based on the target data transfer rate, a first data transfer rate of a plurality of supported data transfer rates and a second data transfer rate different from the first data transfer rate of the plurality of supported data transfer rates, wherein each of the plurality of supported data transfer rates are supported by the network device; and
achieving data transfer at the target data transfer rate by alternating between transferring data at the first data transfer rate and transferring data at the second data transfer rate.

9. The network device of claim 8, wherein the first data transfer rate is higher than the target data transfer rate and the second data transfer rate is lower than the target data transfer rate.

10. The network device of claim 9, wherein the operations further comprise:
determining that the first data transfer rate is a closest supported data transfer rate to the target data transfer rate that is higher than the target data transfer rate;
determining that the second data transfer rate is a closest supported data transfer rate to the target data transfer rate that is lower than the target data transfer rate; and
selecting the first data transfer rate and the second data transfer rate.

11. The network device of claim 9, wherein the operations further comprise:
transmitting data at the second data transfer rate for a first period of time;

determining an actual amount of data transmitted at the second data transfer rate in the first period of time;

determining a nominal amount of data that would be transmitted at the target data transfer rate in the first period of time;

determining that a difference between the nominal amount of data and the actual amount of data exceeds a predetermined threshold; and transmitting data at the first data transfer rate for a second period of time.

12. The network device of claim 8, wherein the operations further comprise:

determining a nominal amount of data that would be transmitted at the target data transfer rate in a first period of time;

determining that a difference between the nominal amount of data and an actual amount of data transmitted at a first data transfer rate during the first period of time exceeds a threshold, wherein the first data transfer rate is one of the plurality of supported data transfer rates; and responsive to exceeding the threshold, transmitting data at a second data transfer rate for a second period of time, wherein the second data transfer rate is one of the plurality of supported data transfer rates.

13. The network device of claim 12, wherein the first period and the second period are determined based on synchronized time stamps associated with data transmitted at the first data transfer rate and the second data transfer rate.

14. The network device of claim 8, wherein the network device comprises at least one of a network interface card (NIC) or a data processing unit (DPU).

15. A non-transitory computer-readable storage medium comprising instructions that, when executed by a processing device, cause the processing device to perform operations comprising:

receiving, by a network device different from the processing device, a selection of a target data transfer rate, wherein the target data transfer rate is an unsupported data transfer rate that is not supported by the processing device;

determining, based on the target data transfer rate, a first data transfer rate of a plurality of supported data transfer rates and a second data transfer rate different from the first data transfer rate of the plurality of supported data transfer rates, wherein each of the plurality of supported data transfer rates are supported by the network device; and achieving data transfer at the target data transfer rate by alternating between transferring data at the first data transfer rate and transferring data at the second data transfer rate.

16. The non-transitory computer-readable storage medium of claim 15, wherein the first data transfer rate is higher than the target data transfer rate and the second data transfer rate is lower than the target data transfer rate.

17. The non-transitory computer-readable storage medium of claim 16, wherein the operations further comprise:

determining that the first data transfer rate is a closest supported data transfer rate to the target data transfer rate that is higher than the target data transfer rate;

determining that the second data transfer rate is a closest supported data transfer rate to the target data transfer rate that is lower than the target data transfer rate; and selecting the first data transfer rate and the second data transfer rate.

18. The non-transitory computer-readable storage medium of claim 16, wherein the operations further comprise:

transmitting data at the second data transfer rate for a first period of time;

determining an actual amount of data transmitted at the second data transfer rate in the first period of time;

determining a nominal amount of data that would be transmitted at the target data transfer rate in the first period of time;

determining that a difference between the nominal amount of data and the actual amount of data exceeds a predetermined threshold; and transmitting data at the first data transfer rate for a second period of time.

19. The non-transitory computer-readable storage medium of claim 16, wherein the operations further comprise:

determining a nominal amount of data that would be transmitted at the target data transfer rate in a first period of time;

determining that a difference between the nominal amount of data and an actual amount of data transmitted at a first data transfer rate during the first period of time exceeds a threshold, wherein the first data transfer rate is one of the plurality of supported data transfer rates; and responsive to exceeding the threshold, transmitting data at a second data transfer rate for a second period of time, wherein the second data transfer rate is one of the plurality of supported data transfer rates.

20. The non-transitory computer-readable storage medium of claim 19, wherein the first period and the second period are determined based on synchronized time stamps associated with data transmitted at the first data transfer rate and the second data transfer rate.

21. The non-transitory computer-readable storage medium of claim 15, wherein the processing device comprises at least one of a network interface card (NIC) or a data processing unit (DPU).

* * * * *